(No Model.) 4 Sheets—Sheet 1.
F. C. GAMMONS.
MACHINE FOR HANDLING, CLEANING, AND DISTRIBUTING SEED COTTON.
No. 547,516. Patented Oct. 8, 1895.
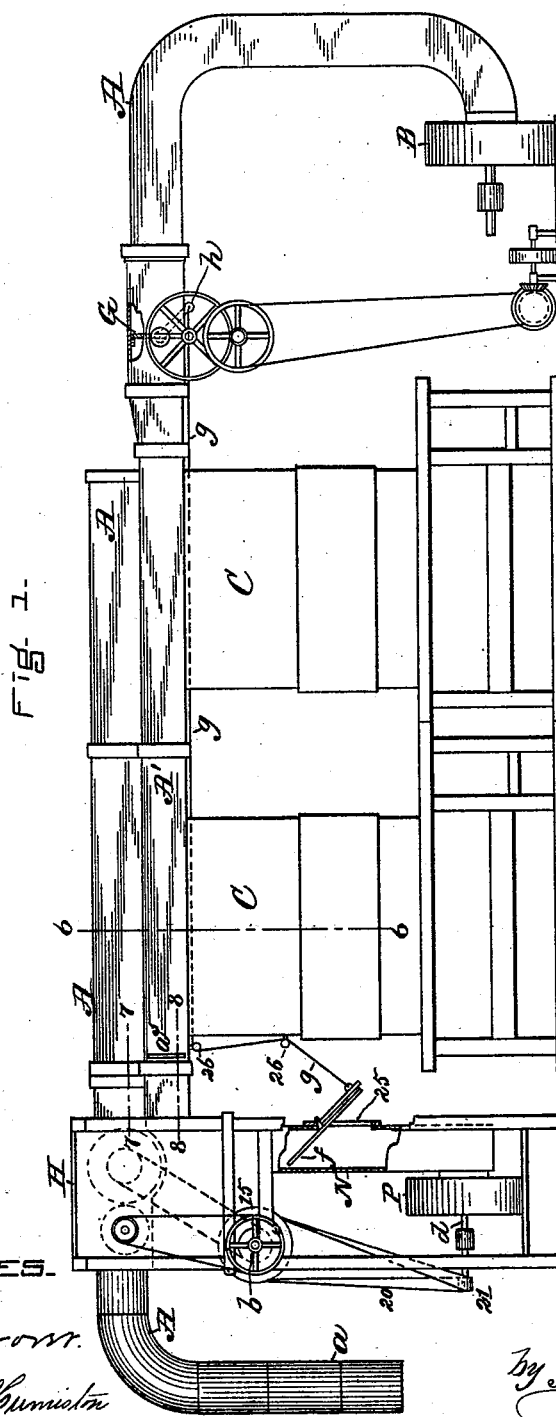
WITNESSES
INVENTOR
Ferdinand C Gammons

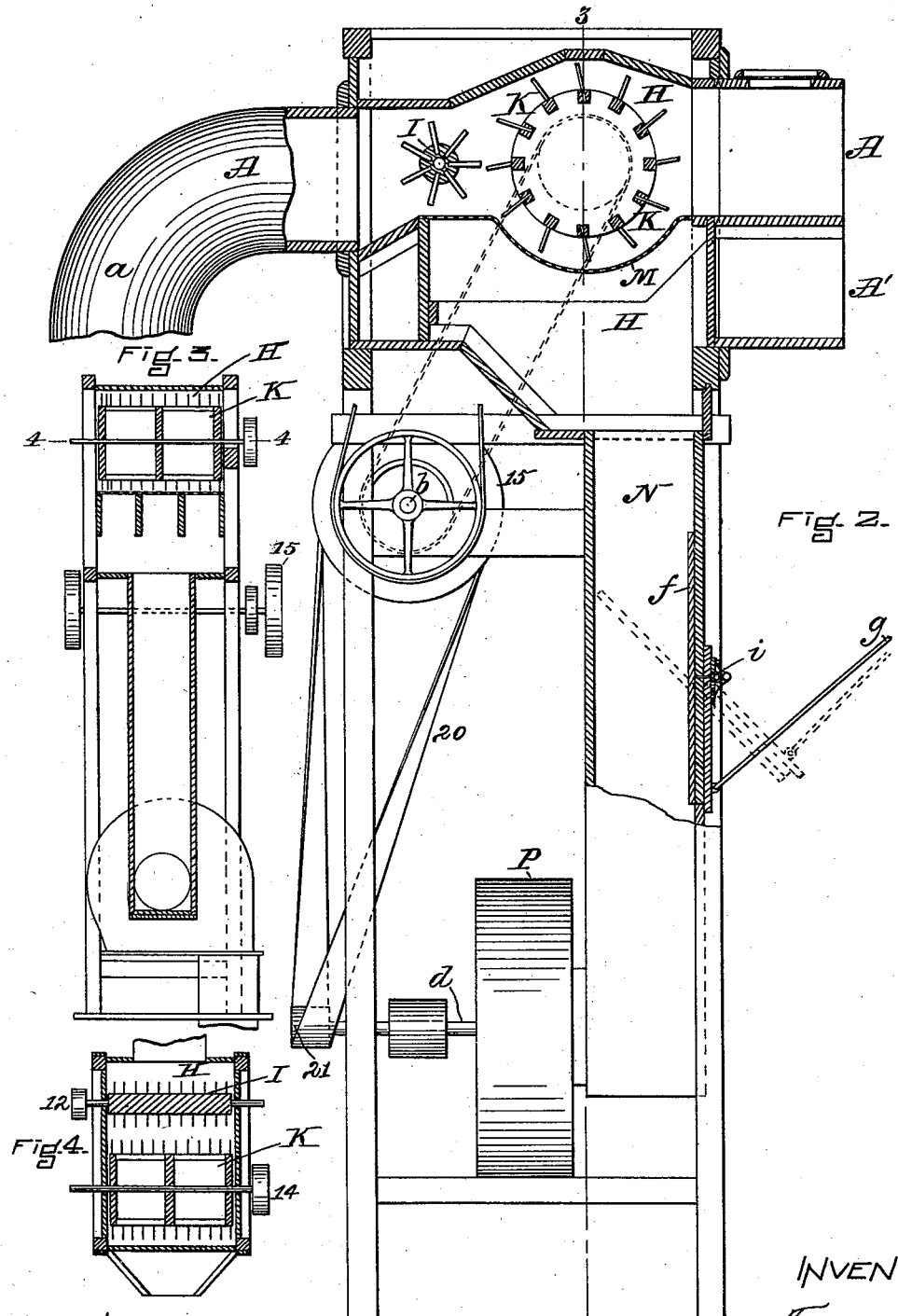

(No Model.) 4 Sheets—Sheet 3.
F. C. GAMMONS.
MACHINE FOR HANDLING, CLEANING, AND DISTRIBUTING SEED COTTON.
No. 547,516. Patented Oct. 8, 1895.
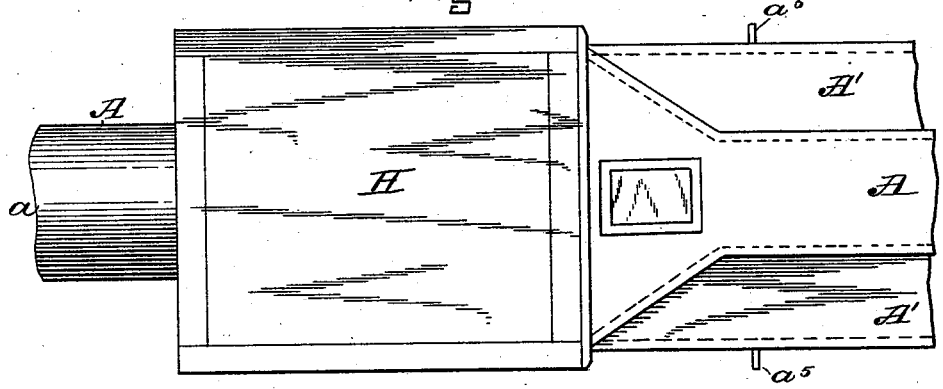
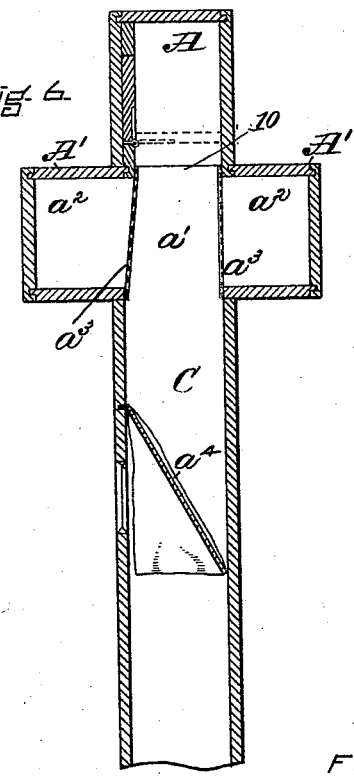
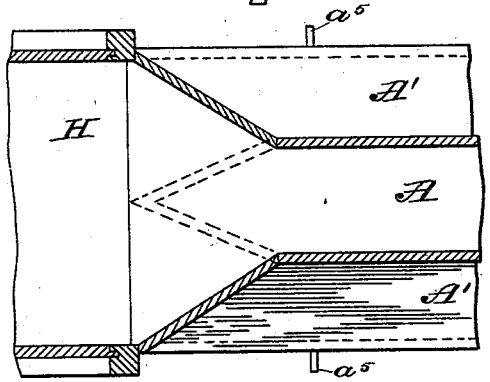
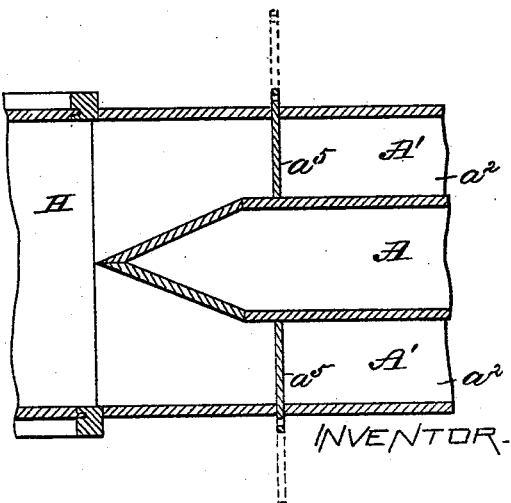
WITNESSES. INVENTOR.

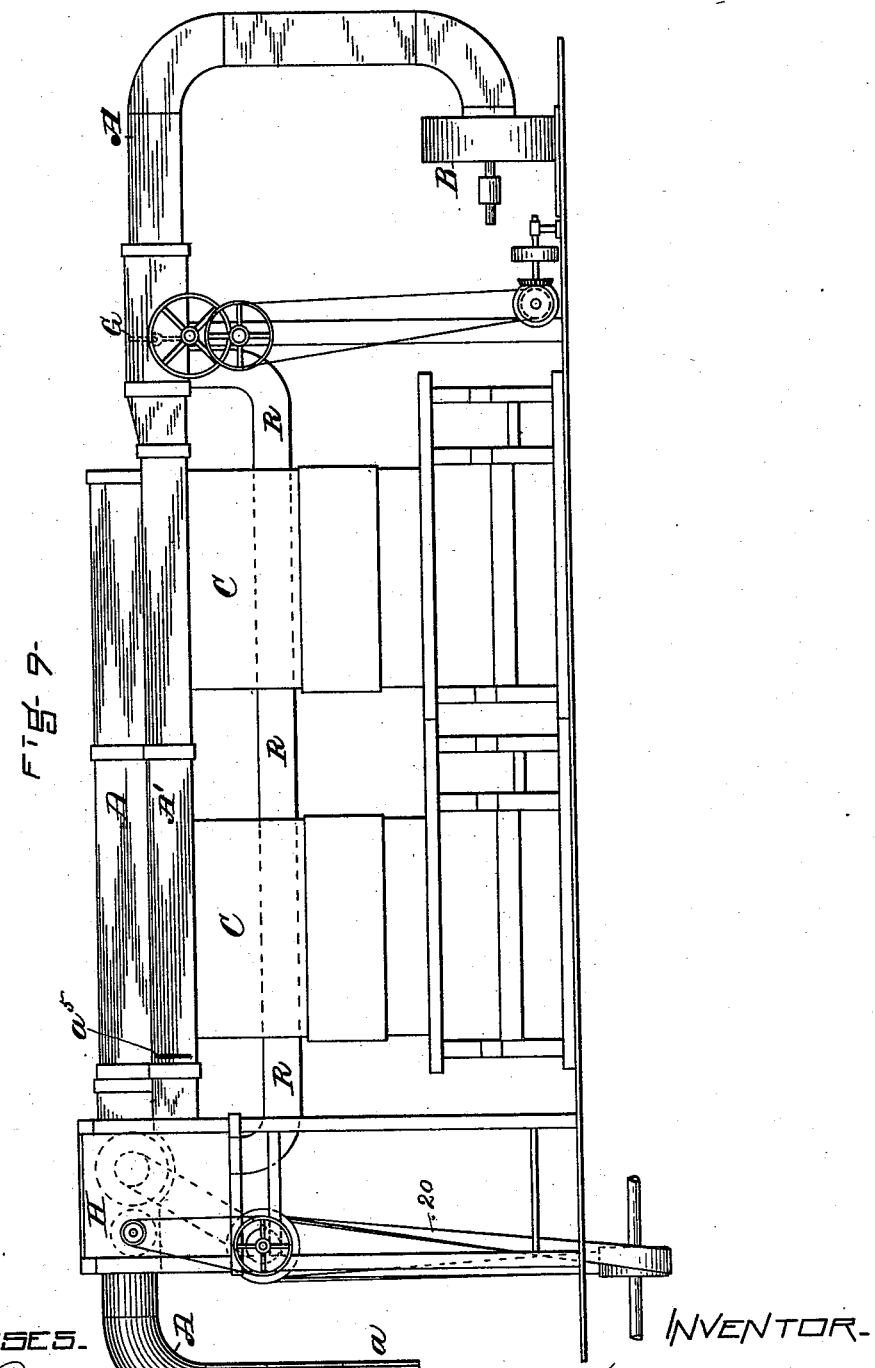

UNITED STATES PATENT OFFICE.

FERDINAND C. GAMMONS, OF BRIDGEWATER, MASSACHUSETTS, ASSIGNOR TO THE EAGLE COTTON GIN COMPANY, OF SAME PLACE.

MACHINE FOR HANDLING, CLEANING, AND DISTRIBUTING SEED-COTTON.

SPECIFICATION forming part of Letters Patent No. 547,516, dated October 8, 1895.

Application filed July 5, 1895. Serial No. 555,047. (No model.)

*To all whom it may concern:*

Be it known that I, FERDINAND C. GAMMONS, a citizen of the United States, residing at Bridgewater, in the county of Plymouth and State of Massachusetts, have invented certain new and useful Improvements in Machines for Handling, Cleaning, and Distributing Seed-Cotton, of which the following is a full, clear, and exact description, reference being had to the accompanying drawings, making part of this specification, in which—

Figure 1 is a side elevation of my improved apparatus for conveying, cleaning, and distributing seed-cotton. Fig. 2 is an enlarged longitudinal vertical section through the left-hand end of the same. Fig. 3 is a vertical section on the line 3 3 of Fig. 2, drawn on a reduced scale. Fig. 4 is a horizontal section on the line 4 4 of Fig. 3. Fig. 5 is a plan of the end portion of the apparatus shown in Fig. 2. Fig. 6 is an enlarged vertical section on the line 6 6 of Fig. 1. Fig. 7 is an enlarged horizontal section on the line 7 7 of Fig. 1. Fig. 8 is an enlarged horizontal section on the line 8 8 of Fig. 1. Fig. 9 is a side elevation of my apparatus, illustrating a modification of my invention.

My invention relates to pneumatic apparatus for conveying seed-cotton from a wagon, store-house, or bin to the cotton-gin feeders or other desired location, and has for its object to provide such apparatus with cotton picking and cleaning mechanism embodying certain novel features, whereby the cottton is more rapidly and thoroughly cleaned than has heretofore been found possible in apparatus of this description.

To this end my invention consists in the combination, with cotton-picking mechanism contained in a throughway-chamber forming a part of the exhaust-tube of a cotton-seed conveyer, said chamber being provided with a screen arranged beneath the picking mechanism, of an exhaust tube or flue entering said chamber beneath said screen and connected with an exhaust-fan, whereby as the cotton is drawn over the screen by the suction in the conveyer-tube and the action of the picking mechanism the dust, dirt, and foreign matter separated from the cotton by the picking mechanism are rapidly and forcibly sucked down through the screen and discharged by the fan into a suitable receptacle or convenient location outside the gin-house, as hereinafter more fully described; and my invention also consists in certain novel features and combinations of parts, as hereinafter set forth and specifically claimed.

In the said drawings, A represents a horizontally-arranged pneumatic tube or conveyer having an inlet end $a$, which is adapted to be placed over a wagon, bin, or other receptacle from which the cotton is to be drawn by suction and carried forward to the cotton-gin feeders or other desired location, the suction being produced by means of an exhaust-fan B, connected with the tube A at a point opposite to that where the cotton is received. Directly beneath the tube A and communicating therewith through longitudinal openings 10 in its bottom, as shown in Fig. 6, is a horizontally-arranged box or casing A', which is of greater width than the tube A and is divided up by partitions into central spaces $a'$ into which the cotton falls from the said tube A through the openings 10 in its bottom and then passes by gravity into a series of receiving-boxes or gin-feeders C, which are suitably secured to the bottom of the casing A' and are in communication with the said spaces $a'$, as shown in Fig. 6. Lengthwise of the casing A' on each side is formed an air-passage $a^2$, Fig. 6, which is separated from the central spaces $a'$ of the casing A' by wire-gauze screens $a^3$, through which the incoming air passes from the tube A and spaces $a'$ to said passages $a^2$ and thence to the exhaust-fan B. The conveyer-tube A and casing A' above described are substantially the same as those described in the United States patent of S. D. Murray, No. 472,607, dated April 12, 1892, and forms no part of my invention.

Each of the cotton-gin feeding-boxes C is provided, as usual, with a flexible check-valve $a^4$, (shown in Fig. 6,) which when the exhaust-fan B is producing the suction is kept tightly closed by the pressure of the external air from beneath; but as the construction of these boxes and their valves is well known and forms no part of my present invention it will not be further described.

G is an air or cut-off valve located in the conveyer-tube A near the end to which the exhaust-fan B is applied, as shown in Fig. 1, said valve being adapted to be operated automatically at fixed intervals corresponding to the time required to fill the cotton-receiving boxes by suitable mechanism—as, for instance, that shown and described in Letters Patent of the United States No. 500,804, granted to me July 4, 1893; but as this mechanism forms no part of my present invention it will not be herein described.

Connected with the conveyer-tube A and forming a part of the same is a casing or chamber H, which is located between the inlet end $a$ of the tube A and the first cotton-receiving box C, and within this chamber H are placed two toothed picking cylinders or beaters I K, the shafts of which are provided with pulleys 12 14, Fig. 4, driven by belts from pulleys on a counter-shaft $b$, the latter having secured to it a pulley 15, Fig. 2, driven by a belt 20, passing over a pulley 21 on the driving-shaft $d$. The small toothed cylinder I, which acts on the cotton as it enters the chamber H and serves to break up the lumps or matted bunches and separate the locks, is preferably rotated at a speed of about one thousand revolutions per minute, while the second or larger toothed cylinder K is revolved at a speed of about four hundred revolutions per minute, and serves to draw the cotton forward when loosened up or separated by the cylinder I and carry it forward in a thin layer over a screen M, composed of wire-cloth or perforated metal, said screen being located beneath the cylinders I K at a short distance from the ends of the teeth or pins $e$, as shown in Figs. 2 and 3, whereby as the cotton passes over the screen the sand, dirt, and foreign matter separated therefrom will pass through into the lower portion of the chamber H. The two side air-passages $a^2$ of the casing A' are connected with the chamber H at a point beneath the screen M, as shown in Fig. 8, for a purpose to be hereinafter described, and each of said passages $a^2$ is provided with a slide or valve $a^5$, by which communication between the said passages $a^2$ and the chamber H may be entirely cut off, said valves being always kept closed except under certain conditions, to be hereinafter described.

N, Figs. 1 and 2, is an exhaust-tube or dust-flue communicating with the bottom of the chamber H, said flue being connected with an exhaust-fan, whereby a strong downward draft or suction is produced to draw the dust and dirt downward through the screen M. This passage or flue N is preferably connected with a second or auxiliary exhaust-fan P, which may be placed beneath the chamber H, as shown, or in any other desired location, the dust and dirt as they are sucked through the screen M being drawn into the fan P and discharged thereby into a suitable bin or other receptacle outside the gin-house. By the employment of the auxiliary fan P, in addition to the fan B, the force of the suction or draft by which the cotton is carried through the conveyer-tube is increased and the operation of the apparatus thereby greatly improved and facilitated. With an exhaust-flue communicating with the bottom of the picker-chamber H, as described, if the suction is continuous in ginning out the last part of a bale of cotton when there is but little cotton in the conveyer-tube, the tendency of the downward suction through the picker-chamber is to lift the canvas valves $a^4$ in the gin-feeding boxes C, thereby preventing the cotton from dropping freely, as desired. To overcome this difficulty, I place a valve $f$ in the dust-flue N, between the picker-chamber and the exhaust-fan connected with said flue, said valve $f$ being connected with the cut-off valve G of the main conveyer-tube A by suitable means in such manner that the closing of the valve G will effect the closing of the valve $f$, whereby the suction or draft from both fans is shut off at the same time, as is necessary to produce the desired result. The valve $f$ is hinged at or near the center of its length to the upper edge of an opening 25, Fig. 1, in the side of the flue N and is connected by a cord or wire $g$ running over suitable guide-pulleys 26, with an arm or lever $h$ secured to the end of the shaft or spindle of the air-valve $g$, whereby, when the latter is closed by the mechanism previously referred to, the cord $g$ will be drawn forward, causing the valve $f$ to close the dust-flue N against the resistance of a spring $i$, located at the hinge, which, when the cord is slackened by the counter movement of the arm $h$, will open the valve $f$, as required. When the valve $f$ is closed, air is supplied to the continuously-revolving fan P through the opening 25. I do not wish to limit myself to the employment of a spring for opening the valve $f$, as the latter may be rigidly connected with the valve G, so that the latter will operate the valve $f$ in both directions. I prefer, however, to use a spring, as it enables me to employ a flexible connection between the valves which is simpler and more convenient. Instead of employing a separate or auxiliary exhaust-fan P for producing the downward draft through the screen M and the dust-flue N, a branch tube R may extend from the main tube A to a point in the chamber H beneath the screen M, as shown in Fig. 9, in which case the size of the exhaust-fan B should be increased, as it will then be used to produce a draft or suction both in the tube A and branch tube R. I prefer, however, to use a separate fan, as first described. When the fan P is dispensed with and the parts arranged as shown in Fig. 9, the flue N and valve $f$ therein will not be required, as the branch pipe R will enter the main tube A at a point between the air-valve G and the chamber H, so that the closing of the valve G will simultaneously cut off the suction through both the tube A and branch pipe R and produce the result previously described. Instead of employing either the auxiliary valve P, with its dust-flue N, or the branch pipe R, as described, the same result may be obtained by opening the slides or valves $a^5$, (shown in Fig. 8,) when the side air-passages $a^2$ will be connected with the chamber H at a point beneath the screen M, and will then act as dust-flues, through which the dirt and dust will be sucked by the fan B, and discharged thereby in the same manner as previously described. By thus applying to a pneumatic seed-cotton conveyer the above-described picker mechanism with the means described for drawing the dust and dirt from the cotton down through a screen and discharging the same by means of an exhaust-fan, a complete apparatus is provided in which the cotton is separated and freed from lumps and thoroughly and perfectly cleaned from dust or foreign matter in its passage from a wagon or store-house to the gin or other location with a single feeding of the cotton, whereby a considerable saving in time and labor is effected.

What I claim as my invention, and desire to secure by Letters Patent, is—

1. In a seed-cotton conveyer, the combination with a pneumatic conveyer-tube and an exhaust-fan connected therewith, of a chamber forming a throughway portion of said tube, cotton picking mechanism placed within said chamber, a screen located beneath the picking-mechanism, and an exhaust-tube or flue entering the picker-chamber beneath the screen, whereby as the cotton is drawn over the screen the dust and foreign matter separated therefrom will be sucked down through said screen into the dust-flue and discharged therefrom, substantially as set forth.

2. In a seed-cotton conveyer, the combination with a pneumatic conveyer-tube provided with a cotton receiving inlet and an exhaust-fan, whereby the cotton is drawn through the inlet to the point of delivery, of a chamber forming a throughway portion of said conveyer-tube, cotton-picking-mechanism placed within said chamber, a screen located beneath the picking mechanism, and an exhaust tube or flue entering the picker-chamber beneath the screen and provided with a separate or auxiliary exhaust-fan, whereby as the cotton is drawn over the screen by the suction in the conveyer-tube and the action of the picking-mechanism, the dust and foreign matter separated from the cotton will be drawn downward through the screen into the dust-flue and discharged therefrom by the fan, substantially as set forth.

3. In a seed-cotton conveyer, the combination with a pneumatic conveyer-tube provided with a cotton-receiving inlet, a series of cotton receiving boxes or gin-feeders, and an exhaust fan whereby the cotton is drawn through said tube to said boxes, and an air or cut off valve placed within the conveyer tube, of a chamber forming a throughway portion of said conveyer-tube between its inlet and the first box or feeder, cotton picking mechanism placed within said chamber, a screen located beneath the picking-mechanism and out of the path of the cotton through said chamber, and an exhaust tube or flue entering the picker-chamber beneath the screen, and connected with an exhaust-fan, whereby as the cotton is drawn over the screen, the dust and foreign matter separated therefrom will be sucked down through said screen into the dust-flue and be discharged by the fan, substantially as described.

4. In a seed-cotton conveyer, the combination with a pneumatic conveyer-tube provided with a cotton receiving inlet, a series of cotton receiving boxes or gin feeders, and an exhaust-fan, whereby the cotton is drawn through said tube to the said boxes, of a chamber forming a portion of said conveyer tube, and provided with cotton-picking mechanism, a screen located beneath the latter, an exhaust-tube or flue entering said chamber beneath the screen and provided with a cut-off-valve, and a separate exhaust-fan, whereby the dust and foreign matter separated from the cotton are sucked down through the screen as the cotton passes over the latter, an air or cut-off valve placed in the conveyer-tube, and suitable connections between said valve and the valve in the dust-flue, whereby both valves may be operated simultaneously, substantially as described.

5. In a seed-cotton-conveyer, the combination with the conveyer-tube A, provided with a cotton-receiving inlet at one end and an exhaust-fan B, at the opposite end, and a series of cotton-receiving boxes connected with said tube, of the picker-chamber H, provided with the rotary toothed picker-cylinders I, K, the screen M, located beneath the picker-cylinders, the exhaust tube or flue N, provided with a cut-off valve $f$, and an opening 25, the exhaust fan P, connected with the tube N, the air valve G, in the tube A, and suitable connections between the valves G, and $f$, whereby both valves may be operated simultaneously, all constructed to operate substantially in the manner and for the purpose set forth.

6. In a seed-cotton conveyer, the combination with a pneumatic conveyer-tube A, and an exhaust-fan connected therewith, said conveyer-tube having openings in its under side, a box or casing A', having central spaces communicating with said pneumatic tube and provided with side air-passages $a^2$, having inner screen walls, and a series of cotton receiving boxes or receptacles communicating with said central spaces, of a chamber forming a portion of the conveyer-tube A, cotton-picking-mechanism placed within said chamber, and a screen located beneath the picking mechanism, the side air passages $a^2$, of the box or casing A', communicating with the chamber H, at points beneath the screen, and being provided with valves adapted to entirely close the same and to be opened when said passages are to be used as dust-flues, substantially as described.

Witness my hand this 26th day of June, A. D. 1895.

FERDINAND C. GAMMONS.

In presence of—
P. E. TESCHEMACHER,
ALICE E. HUMISTON.